(12) United States Patent
Marchal et al.

(10) Patent No.: US 8,131,089 B2
(45) Date of Patent: Mar. 6, 2012

(54) VISIBILITY DATA COMPRESSION/DECOMPRESSION METHOD, COMPRESSION SYSTEM AND DECODER

(75) Inventors: Isabelle Marchal, Rennes (FR); Christian Bouville, Vern sur Seiche (FR); Loïc Bouget, Rennes (FR)

(73) Assignee: France Telecom, Paris (FR)

( * ) Notice: Subject to any disclaimer, the term of this patent is extended or adjusted under 35 U.S.C. 154(b) by 1080 days.

(21) Appl. No.: 11/661,029

(22) PCT Filed: Aug. 19, 2005

(86) PCT No.: PCT/FR2005/050678
§ 371 (c)(1),
(2), (4) Date: Feb. 23, 2007

(87) PCT Pub. No.: WO2006/027519
PCT Pub. Date: Mar. 16, 2006

(65) Prior Publication Data
US 2007/0258650 A1 Nov. 8, 2007

(30) Foreign Application Priority Data
Aug. 31, 2004 (FR) ...................................... 04 09234

(51) Int. Cl.
*G06K 9/36* (2006.01)
(52) U.S. Cl. .......................... 382/232; 382/209; 382/272
(58) Field of Classification Search .................. 382/232, 382/209, 272, 292, 171, 182, 194, 229, 203, 382/225, 286; 345/649; 707/11; 715/854
See application file for complete search history.

(56) References Cited

U.S. PATENT DOCUMENTS

| 4,280,134 | A * | 7/1981 | Tooyama et al. ............. 348/811 |
| 4,280,143 | A * | 7/1981 | Judd ........................ 358/426.14 |
| 6,388,688 | B1 * | 5/2002 | Schileru-Key ................ 715/854 |
| 2002/0113805 | A1 | 8/2002 | Li et al. |
| 2006/0253410 | A1 * | 11/2006 | Nayak et al. ...................... 707/1 |

OTHER PUBLICATIONS

Michiel van de Panne and A. James Stewart, "Effective Compression Techniques for Precomputed Visibility", Eurographics Workshop on Rendering in 1999, p. 1-13.*
HUa et al, The Global Occlusion Map: A New Occlusion Culling Approach, Nov. 11-13, 2002, Hong Kong.2002 ACM, p. 1-7.*
Zach et al., "Progressive Compression of Visibility Data for View-Dependent Multiresolution Meshes", Journal of WSCG, vol. 11, No. 3, pp. 546-553, Feb. 6, 2003.
Moreira et al., "Smart visible sets for networked virtual environments", Computer Graphics and Image Processing, Proceedings, IEEE Computer Soc., pp. 373-380, 2002.
Teller et al., "Partitioning and Ordering Large Radiosity Computations", Proceedings of ACM Siggraph, pp. 443-450, Jul. 1994.

(Continued)

*Primary Examiner* — Brian Q Le
*Assistant Examiner* — Mek Bekele
(74) *Attorney, Agent, or Firm* — Cozen O'Connor

(57) ABSTRACT

Non-adjacent rows (i) in the visibility matrix (Msr) that have a large number of common elements are automatically detected (E7) and any such detected rows are permutated to put the lines detected as having a large number of common elements into sequence to form a modified visibility matrix (M'sr), and digital image coding is applied (E8) to the Boolean elements of the modified visibility matrix (M'sr).

19 Claims, 5 Drawing Sheets

OTHER PUBLICATIONS

Masatoshi K. et al "Inner-product Degeneration MC: A Matrix-clustering Algorithm Combining Detections of Similar Rows and Similar Columns", Information Processing Society of Japan Transactions, vol. 45, No. SIG7 (TOD22) IPSJ, Japan, Information Processing Society of Japan, Jun. 15, 2004, vol. 45, No. SIG7(TOD22), pp. 151-162.

* cited by examiner

VISIBILITY DATA COMPRESSION/DECOMPRESSION METHOD, COMPRESSION SYSTEM AND DECODER

RELATED APPLICATIONS

This is a U.S. National Phase Application under 35 USC 371 of International Application PCT/FR2005/050678, filed on Aug. 19, 2005.

FIELD OF THE INVENTION

The invention relates to a method of compressing and a method of decompressing visibility data from a visibility database, and to systems for implementing these methods.

A field of application of the invention is the display of objects of a scene from an observation point that is mobile within that scene, for example in a simulation or a game, where the observation point is the virtual observation point of the user moving within the scene.

The objects are typically predefined and the observation point is movable in their environment, which should change the appearance of the objects represented on the screen, because they are seen at different angles, because they are occluded, or because new objects that were previously occluded appear.

BACKGROUND OF THE INVENTION

One of the problems encountered when displaying objects is the large quantity of data to be taken into account on each movement of the observation point, which might be moved very fast under the control of the user.

The paper by Peter Wonka, Michael Wimmer, and Dieter Schmalstieg, "Visibility Preprocessing with Occluder Fusion for Urban Walkthroughs", Proceedings of Eurographic Rendering Workshop, 2000, proposes dividing the observation space into viewing cells, reducing occluder objects by an amount $\epsilon$ and, for each cell, determining a sufficient number of sampling points thereof and calculating the visibility for each sampling point to obtain a set of objects potentially visible from that cell.

Those sets of potentially visible objects are present for each cell, however, and represent a very large volume of data.

The paper by Michiel van de Panne and A. James Stewart, "Effective Compression Techniques for Precomputed Visibility", Rendering Techniques 1999, pages 305 to 316, 1999 proposes dividing the observation point space into small regions or cells, and constructing a Boolean visibility table, coding information determined beforehand in a preliminary calculation step, and indicating which polygons are visible from each region. In that visibility table, each row corresponds to a cell of observation points and each column corresponds to a polygon. Any entry situated in row i, column j of the visibility table is in the True state if and only if the polygon j is at least potentially visible from a point of the region i. To compress the visibility table, a lossy compression algorithm merges rows and columns having similar sets of True entries. A different, this time lossless, compression algorithm adds new rows and columns to the visibility table, the new rows and columns being obtained from rows having common entries. Consequently, either information is lost in the first algorithm or the visibility table remains too large. Moreover, those algorithms are not suitable for networked display, i.e. for display on a user station remote from a database storing the visibility data.

The following documents may also be cited:

C. Gotsman, O. Sudarsky, and J. Fayman, "Optimized Occlusion Culling Using Five-Dimensional Subdivision", Computer Graphics, 23(5): 645-654, 1999, which describes an occlusion sorting algorithm organizing space into a five-dimensional hierarchical visibility tree structure, in which each leaf of the tree contains a reference to one of the leaves of lower level. A True value for the $i^{th}$ position of a leaf indicates the presence of the $i^{th}$ object in that leaf, whereas a False value indicates that the object is not present in that leaf or in the lower level leaves. A drawback of that algorithm is that the tree must be traversed for each observation point. It is not suitable for networked display on a user station remote from a database storing the visibility data.

Boaz Nadler, Gadi Fibish, Shuly Lev-Yehudi, and Danile Cohen-Or, "A qualitative and quantitative visibility analysis in urban scenes", Computer & Graphics, 23(5): 655-666, 1999, which calculates the probability that a given object is visible from a given viewing cell as a function of the distance relative to that cell. The intersection of the sets of potentially visible objects for neighboring cells is estimated in the cell, and cell to cell consistency is exploited to store the data in a hierarchical structure to reduce the number of duplications. The quantity of data nevertheless remains too large.

Christopher Zach and Konrad Karner, "Progressive compression of visibility data for view-dependent multiresolution meshes", Journal of WSCG, vol. 11, no. 3, pp. 546-553, 2003, which proposes a compression method in which visibility information can be stored directly in nodes of a multiresolution structure, and only the necessary portions of the visibility data are transmitted. That method does not determine all of the objects that are visible each time, because it is necessary to await the arrival of new data, which was not transmitted the first time, which introduces unwanted latency into the method.

V. Koltun, Y. Chrysanthou, and D. Cohen-Or, "Virtual Occluders: An Efficient Intermediate PVS Representation", Eurographics Workshop on Rendering, pages 59-70, Eurographics, 2000, which limits itself to defining virtual occluders for a viewing cell, in order to construct a potentially visible set (PVS) for that cell using those virtual occluders, but does not address the problem of the large quantity of data obtained.

Fabio O. Moreira, Joao L. D. Comba, and Carla M. D. S. Freitas, "Smart Visible Sets for Networked Virtual Environments", SIBGRAPI 2002, which defines smart visible sets (SVS) that correspond to a partitioning of the information of the potentially visible sets (PVS) into dynamic subsets taking account of position. A classification mechanism enables only data classified as being the most important to be transmitted. Consequently, there is a loss of data. That technique has not been tested for very large databases, or in a network situation.

SUMMARY OF THE INVENTION

One object of the invention is to provide a visibility data compression method that alleviates the drawbacks of the prior art and, while being largely lossless, significantly reduces the size of the compressed data.

To this end, one aspect of the invention is directed to a method of compressing visibility data from a visibility database;

the visibility data including cells of observation points in an observation space for observing predetermined objects and, for each cell of observation points, a list of the objects from among said predetermined objects that are potentially visible from that cell of observation points; and the visibility data being represented in the database at least in the form of a first visibility matrix of Boolean elements in which each row corresponds to a cell and each column corresponds to one of said predetermined objects, the Boolean elements respectively situated in the $i^{th}$ row and the $j^{th}$ column having the logic value 1 if the object j belongs to the list of potentially visible objects associated with the cell i and having the logic value 0 otherwise;

characterized by:

automatically detecting in the database rows in the visibility matrix that have a high number of common elements and that are not adjacent, and permutating any such rows to put rows detected as having a high number of common elements into sequence to form a modified visibility matrix; and automatically applying digital image coding to the Boolean elements of the modified visibility matrix to obtain a visibility data code, these Boolean elements of the modified visibility matrix forming the pixels of the digital image for coding.

According to other embodiments of the invention:

the visibility database being associated with a data processing system, the system transmits the visibility coding data generated to a visibility data processing unit;

the data processing system is a data server and the visibility data processing unit is a visibility data processing station;

the data processing system and the visibility data processing unit are provided in the same visibility data processing station;

the data processing system having received information as to the position of a particular observation point in the observation space from the processing unit beforehand and the observation space having been divided into regions in the visibility database, the following steps are automatically executed in the data processing system:

determining an observation region from among the regions of the observation space to which the observation point corresponding to the position information received from the unit belongs;

determining first cells from among the cells of visibility data having an intersection with the observation region;

extracting, from the first visibility matrix, a second visibility matrix in which the rows are formed of the rows of the first visibility matrix that correspond to said first cells of the observation region that have been determined; and forming the modified visibility matrix from the second visibility matrix;

a list of the objects potentially visible from the observation region is automatically determined in the data processing system from the second visibility matrix and is sent to the processing unit by the data processing system with the visibility data code;

a list of the identifiers of the cells of the modified visibility matrix is sent to the processing unit by the data processing system with the visibility data code;

the identical rows of the visibility matrix are automatically determined in the data processing system, in order to retain in a fourth visibility matrix only one row per group of identical rows, the modified visibility matrix being formed from the fourth visibility matrix, and there are calculated automatically in the data processing system a data item that is the number of groups of identical rows of the visibility matrix and for each group of identical rows a group data item comprising a number of identical rows of the group and a list of the identifiers of the identical rows of said group, said data item that is the number of groups of identical rows and said group data item being sent to the processing unit by the data processing system with the visibility data code;

for each group of identical rows, the number of identical rows of said group is coded on a predetermined number of bits and each identifier of the identical rows from said list of said group is coded on a predetermined number of bits, each group data item consisting, in a prescribed sequence for all the groups, of said number of identical rows of the group and said list of the identifiers of the identical rows of the group;

at least one column of 0s in the visibility matrix is detected automatically and any such column of 0s detected is automatically eliminated from the visibility matrix to form a third visibility matrix from which the modified visibility matrix is formed;

said digital image coding applied to the Boolean elements of the modified visibility matrix is of the JBIG or PNG type.

Another aspect of the invention is directed to a method of decompressing visibility code data generated by the visibility data compression method as described above, characterized in that digital image decoding is applied to the generated visibility data code, which decoding is the converse of the digital image coding applied by said compression method, the decoding producing a visibility matrix.

According to other features of this decompression method:

columns of 0s are added automatically to the visibility matrix obtained by said digital image decoding at the locations of the objects that are not potentially visible indicated by the list of objects potentially visible from the observation region; and there is automatically added to the visibility matrix obtained by said digital image decoding the at least one missing row indicated by the identifiers of identical rows present in the list of identifiers of the identical rows of the group data item and absent from said visibility matrix, that at least one missing row then being equal to the row of the visibility matrix having the identifier present in said list of identifiers of the identical rows.

A further aspect of the invention is directed to a decoder including means for executing the visibility data decompression method as described above.

Another aspect of the invention is directed to a system associated with a visibility database;

the visibility data including cells of observation points in an observation space for observing predetermined objects and, for each cell of observation points, a list of objects from among said predetermined objects that are potentially visible from that cell of observation points; and the visibility data being represented in the database at least in the form of a first visibility matrix of Boolean elements in which each row corresponds to a cell and each column corresponds to one of said predetermined objects, the Boolean elements respectively situated in the $i^{th}$ row and the $j^{th}$ column having the logic value 1 if the object j belongs to the list of potentially visible objects associated with the cell i band having the logic value 0 otherwise;

the system including means for executing the visibility data compression method as described above.

Another aspect of the invention is directed to a computer program including instructions that implement the data compression method described above when it is executed on a computer.

Another aspect of the invention is directed to a computer program including instructions that implement the data decompression method described above when it is executed on a computer.

DETAILED DESCRIPTION OF THE DRAWINGS

Figure 1:
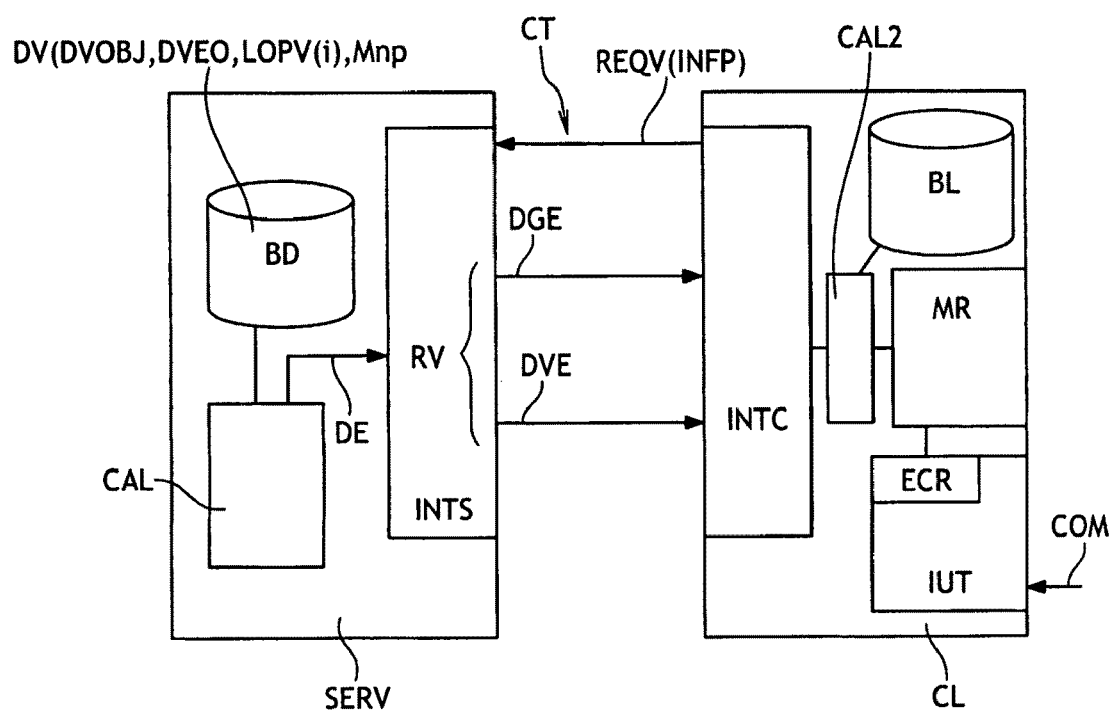
FIG. 1 represents diagrammatically a client-server device in which the data compression and decompression methods according to the invention are implemented.

An embodiment of the invention is described below as comprising a device for displaying objects, using a client-server architecture, for example, in which a server SERV hosts visibility data DV for the objects in a database BD. The objects correspond to a geometrical data set DVOBJ modeling a real or abstract object. The server SERV, including data processing means in its computer CAL, also forms a data processing system SERV. A station CL of the user remote from the server SERV is connected thereto by a telecommunications channel CT in order to send it requests, this station CL therefore constituting a data processing unit. The server SERV sends responses to these requests to the station CL on the channel CT. The channel CT crosses one or more telecommunications networks, for example, the server SERV and the station CL being each provided for this purpose with a network interface INTS, INTC.

Of course, in other embodiments that are not shown, the database BD and the data processing system SERV may also be present on the same machine as the station CL, for example on a computer of the user. For example, the database BD could then be in a mass memory of the computer, for example a hard disk, or on a removable storage medium, for example a CD-ROM, introduced into a corresponding reader of the computer, and the compressed data must be produced so that it can be processed as quickly as possible by a unit in the computer.

Below, the processing of the compressed visibility data consists in displaying an image determined therefrom.

The station CT has a user interface IUT comprising a screen ECR for reproducing an image and loudspeakers, for example. The image displayed on the screen ECR is computed by a rendering engine MR from data received over the network interface INTC and, where applicable, also from data from a local database BL in the station CL.

By way of example, it is assumed that the user interface IUT further includes controls COM, such as a joystick, for example, enabling the user to move a cursor or other elements on the screen ECR within a scene or environment SC displayed as an image on the screen ECR. Such action is referred to as navigation within the scene. The scene SC is in two or three dimensions, the description given below being for a three-dimensional scene. The description given for a three-dimensional scene is of course applicable, with corresponding adaptations, to a two-dimensional scene.

It is assumed that the image displayed on the screen ECR is the scene SC seen from an observation point P situated at the location of the cursor, which is therefore moved in the scene SC on each navigation. Navigation obliges recalculation of the image, which is modified relative to the image previously displayed on the screen ECR. The space within which the observation point P may be moved in the scene SC is called the observation (or navigation) space EO.

The scene SC includes a plurality p of objects OBJ that are present, the observation space EO being then formed by gaps between and around the objects OBJ. The space EO is equal to the complement of the union of all the objects OBJ, for example. The objects OBJ are buildings in a city, for example, the observation space EO then being formed by streets situated between these buildings, for example.

Figure 2:
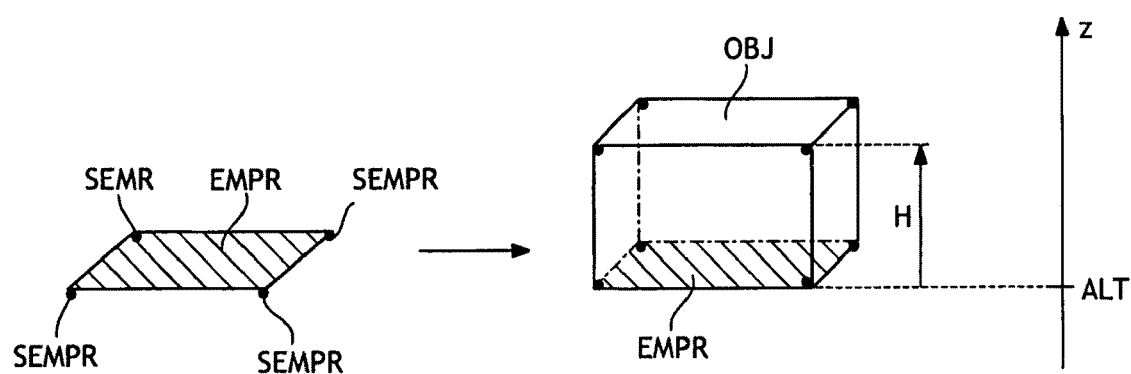
FIG. 2 represents the modeling of a three-dimensional object in 2.5 dimensions.

For example, it is assumed below that the objects OBJ are represented by a 2.5D model, namely a footprint EMPR, an altitude ALT, and a height H along the upward vertical axis z. A three-dimensional object OBJ is deduced from the 2.5D object OBJ by erecting a prism of height H on its footprint EMPR, from its altitude ALT, as per FIGS. 2 and 10. The observation space EO is situated on the ground, for example, and may have different altitudes from one place to another.

The visibility data DV includes the geometrical data DVOBJ specific to the objects, namely, in the foregoing example, the data of the footprints EMPR, such as their shape, for example, the altitudes ALT, and the heights H, together with the coordinates of the objects OBJ in the scene SC, namely, in the foregoing example, the coordinates of the footprints EMPR.

The visibility data DV also includes the data DVEO specific to the observation space EO.

The station CL sends to the server SERV via the channel CT a request REQV for the display of a new image of the scene SC, including information INFP as to the position of the observation point P in the observation space EO (for example its coordinates). The display request REQV is sent automatically on each navigation, for example, each time that the observation point P has been moved from a starting position, which is the position corresponding to the preceding image displayed on the screen ECR, to another position in the scene SC, for which the image must be recomputed in order to be displayed on the screen ECR.

In response to the request REQV received, a computer CAL of the server SERV determines the visibility data DE to be sent in a response RV to the station CL via the channel CT from visibility data DV stored in the database BD and from position information INFP for the observation point P contained in the request REQV. This data DE is sent to the station CL in packets during a step E9, in which station it is processed by its rendering engine MR and its interface IUT. The response RV calculated by the server SERV is stored therein.

The observation space EO is divided into cells i of observation (or viewing) points having precalculated coordinates associated with their individual identifiers i in the database BD and in the local database BL of the station CL. The cells are at least two-dimensional. In FIGS. 2, 3, 4, 5, and 7 the cells are two-dimensional (2D) but the cells could equally be three-dimensional (3D), as described below with reference to FIG. 11, or five-dimensional (5D), as described below with reference to FIG. 12.

Figure 3:
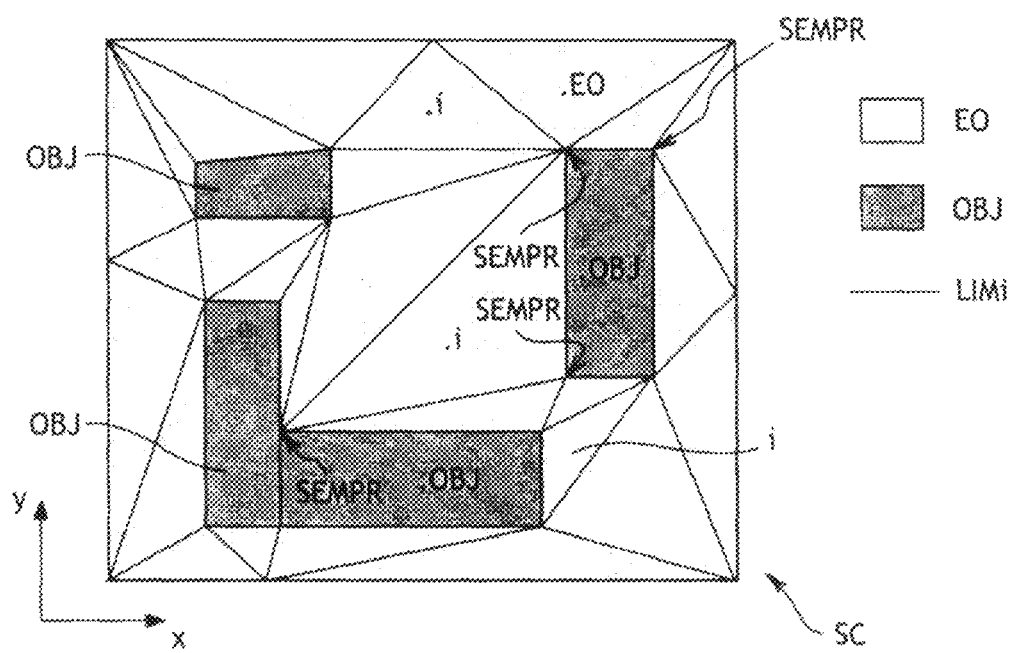
FIG. 3 represents from above a scene including objects and viewing cells for those objects.

The viewing cells i are obtained by two-dimensional triangulation, for example, as shown in FIG. 3, the vertices of the triangles forming the viewing cells i then being formed by the vertices SEMPR at the corners of the footprints EMPR of the objects OBJ and edge points of the scene SC. In FIG. 3, the bold lines LIMi represent the limits of the cells i and therefore consist of the straight line segments forming the sides of the triangular cells i. In a similar manner to the footprints, the three-dimensional viewing cells are obtained by erecting a vertical prism on the triangles.

A viewing cell is a region of an environment containing visibility data for the remainder of the environment, which data is identical regardless of the observation point situated in the cell. The dimension of the viewing cell is deduced according to how the observation points are defined and the observation direction. The observation points may be defined in two dimensions (2D) or in three dimensions (3D). If the observation direction is not taken into account in the visibility calculation, no supplementary dimension is assigned to the viewing cell and it will have the dimensions of the observation point, i.e. two dimensions or three dimensions. If the observation direction is taken into account, one or two dimensions are added that correspond to angle values used to define that direction: with a 2D scene one angle is required to define the direction and with a 3D scene two angles are required most of the time and two dimensions are then added for the viewing cell.

Figure 7:
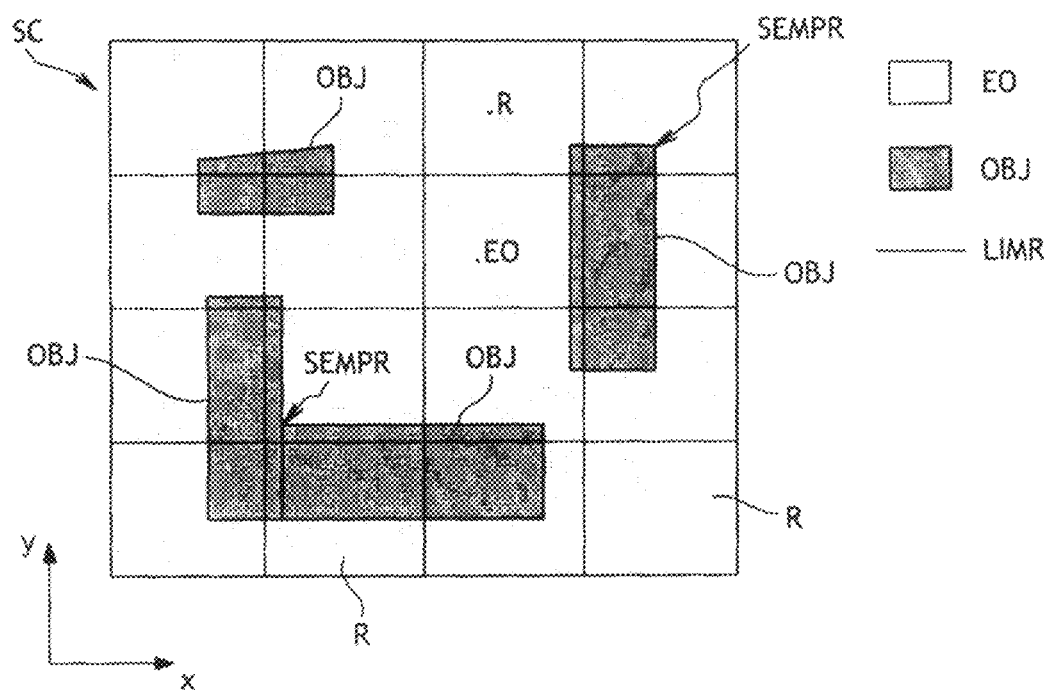
FIG. 7 represents from above the scene from FIG. 3 including objects and divided into regions.
Figure 10:
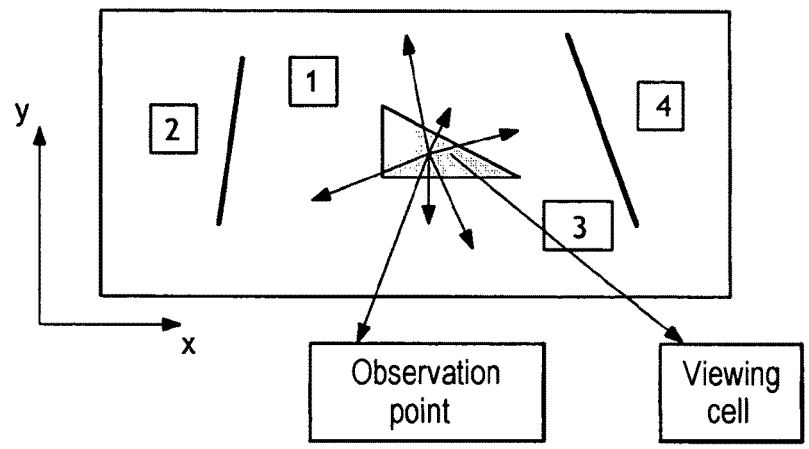
FIG. 10 represents a two-dimensional scene viewing cell.

An example of a 2D viewing cell is represented by a triangle in FIG. 10 and in FIGS. 3 and 7. The viewing cell then contains observation points defined with the aid of two coordinates and the observation direction is not taken into account. The most classic situation is a 2D scene containing two-dimensional viewing cells for which the observation direction is not taken into account. In FIG. 10, objects 1 and 3 are visible from the viewing cell and form the list of potentially visible objects LOPV.

In the embodiments of FIGS. 2, 3, 4, 5, 7 the viewing cells have two dimensions, along the x and y axes, since the viewing cells are formed by erecting them on the triangles forming the base and their visibility data is calculated for all observation directions from an observation point. The navigation height is not taken into account because the situation is that of navigation on the ground and the calculations are carried out subject to this hypothesis.

Figure 11:
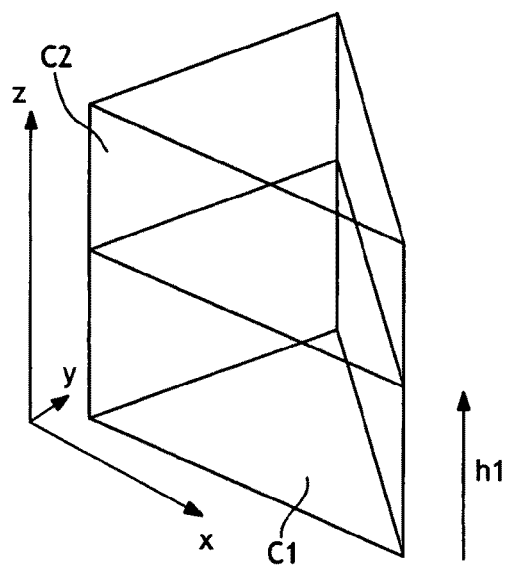
FIG. 11 represents a three-dimensional scene viewing cell.

In FIG. 11, a third dimension is added to the viewing cells of the previous example, visibility information being calculated for different observation point heights along the axis z. The viewing cell then contains three-dimensional observation points, since the visibility information differs according to the height of the points in the observation space. Viewing cells presented as a stack of prisms are obtained. The lowest viewing cell C1 (corresponding to the lowest prism) gives the visibility for its altitudes that are less than the height h1, and the viewing cell C2 (corresponding to the highest prism) situated on top of the cell C1 gives the visibility for altitudes greater than the height h1.

Figure 12:
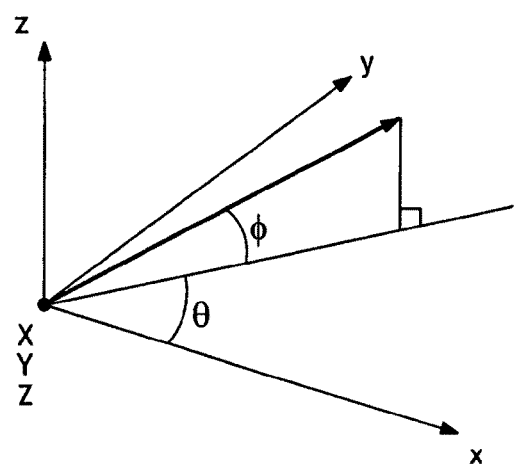
FIG. 12 represents the five dimensions of a 5D scene viewing cell.

FIG. 12 represents the five-dimensional system of coordinates of a 5D viewing cell. In the paper by C. Gotsman, O. Sudarsky, J. Fayman, "Optimized Occlusion Culling Using Five-Dimensional Subdivision", Computer Graphics, 23(5): 645-654, 1999, mentioned above, in the third part of the fourth page, the authors consider a viewing space (the space of all possible viewing radii) with five dimensions: the three dimensions (x, y, z) define the origin of the observation points and the angles $\Theta$ and $\Phi$ define their direction. It is considered that all the dimensions have definition limits. Each viewing cell contains visibility information for observation points P (X such that $x1 \leq X < x2$, Y such that $y1 \leq Y < y2$, Z such that $z1 \leq X < z2$) and for observation directions for which the angles $\Phi$ and $\Theta$ are such that $\Phi1 \leq \Phi < \Phi2$ and $\Theta1 \leq \Theta < \Theta2$, X1, X2, y1, y2, z1, z2, $\Phi1$, $\Phi2$, $\Theta1$ and $\Theta2$ being the limits of the viewing cell.

The database BD contains by way of visibility data DV, in addition to the cells i and the objects OBJ, lists LOPV(i) of objects that are potentially visible from each cell i, also precalculated.

This calculation is effected by the method of Peter Wonka, Michael Wimmer, and Dieter Schmalstieg, for example, as described in their paper "Visibility Preprocessing with Occluder Fusion for Urban Walkthroughs", Proceedings of Eurographic Rendering Workshop, 2000.

According to the invention, to obtain the lists LOPV(i) of objects that are potentially visible from each cell i, a map of the minimum visible heights of the objects relative to that cell is calculated for each cell. That map is obtained by gridding the area on the ground occupied by the scene and containing for each rectangle r the minimum height Hmin(r) in the whole of the rectangle relative to the cell. This map guarantees that an object is not seen from the cell if the object is entirely included within a rectangle r and its height is less than Hmin (r). This map is represented with the aid of a two-dimensional matrix MV called the visibility matrix. Whether each object is potentially visible or not is then verified by comparing the maximum height of the object to the minimum heights Hmin (r) of the rectangles that intersect the footprint EMPR of the object. The objects that are not totally occluded are added to the list LOPV of objects that are potentially visible from the cell.

The matrix MV of the minimum heights Hmin(r) for an observation point is calculated in the following manner.

Figure 4:
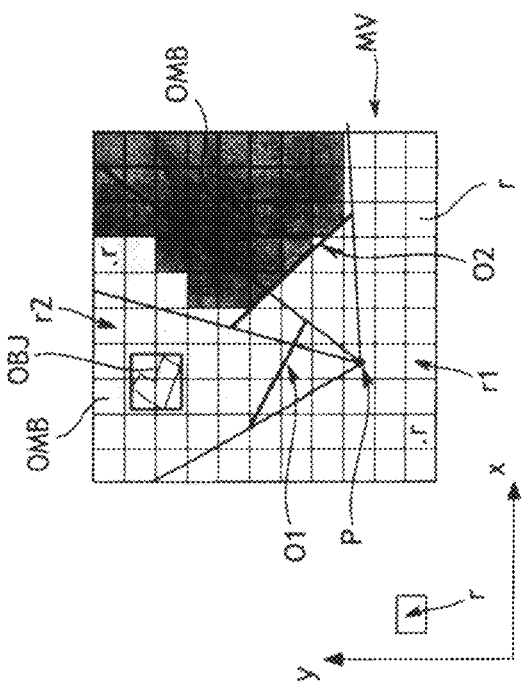
FIG. 4 represents from above shadow volumes generated by occluder facades, which can be used to calculate a list of objects behind those facades that are potentially visible.

Considering an observation point and a building facade (a special case of an object) modeled by a rectangle perpendicular to the ground, the shadow volume OMB is the truncated pyramid defined between the four half-lines passing through the observation point P and the four vertices of the facade, as shown in FIG. 4. This shadow volume OMB guarantees that any object entirely contained within this three-dimensional volume OMB is not visible from the observation point P. The facade is then called the occluder facade. The matrix MV of minimum heights Hmin(r) for the observation point P is deduced from the height of the shadow volumes in each rectangle r of the matrix. In FIG. 4, the shaded rectangles represent the shadow volumes OMB generated by two facades O1 and O2. Thus, with the facades O1 and O2 from FIG. 4, the rectangle r1 situated outside the volumes OMB has a zero minimum height Hmin(r) above the altitude specific to the rectangle r1, and the rectangle r2 situated in the shadow volume OMB generated by the facade O1 has a minimum height Hmin(r2) greater than zero above the altitude specific to the rectangle r2 that passes over the pyramid of the shadow volume of O1 and that can be calculated from the position and the shape defined by that pyramid.

The function Hmin(r) for the cell is then given by:

$$H\min(r) = \min\{H_p(r), p \text{ belonging to } PE\}$$

in which:

PE is the set of sampling points on the edges of the upper face of the cell;

$H_p(r) = \max\{H_{p,o}(r), o \text{ belonging to } FO\}$ is the function representing the minimum height visible from the rectangle r relative to the observation point P;

FO represents the set of occluder facades; and $H_{p,o}(r)$ is the function representing the minimum height visible from the rectangle r relative to the observation point P and taking into account only the occluder facade o.

Figure 5:
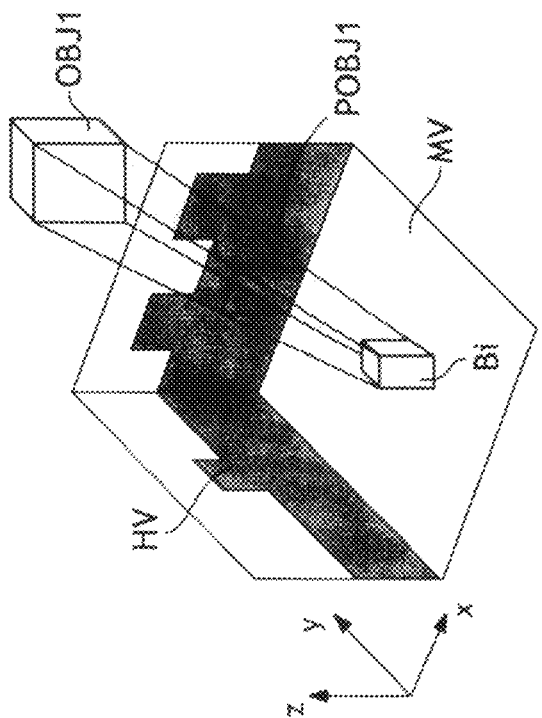
FIG. 5 represents in perspective a visibility horizon generated by the calculation method illustrated in FIG. 4.

The matrix MV of minimum heights Hmin(r) is used to calculate the visibility horizon HV, as shown in FIG. 5. This visibility horizon HV is defined around the visibility matrix MV, for example, and ensures that any object that is outside the area covered by the visibility matrix MV and that is projected under the visibility horizon HV from the box Bi bounding the cell i is not seen from that cell i, as applies in FIG. 5 for the object OBJ1 having the projection POBJ1 under the horizon HV relative to the box Bi.

The lists LOPV(i) of objects that are potentially visible from the cell i are represented in the database BD by a first visibility matrix Mnp with n rows and p columns of Boolean elements having the logical value 1 or 0, in which each row corresponds to a particular cell i and each column j corresponds to a particular object OBJ, where:

$Mnp = (a_{i,j})_{1 \leq i \leq n, 1 \leq j \leq p}$; and $a_{i,j} = 1$ if the object j is potentially visible from the cell i and therefore belongs to the list LOPV(i);

$a_{i,j} = 0$ if the object j is not potentially visible from the cell i and therefore does not belong to the list LOPV(i);

n, p, i, j being natural integers.

The invention provides means for automatically compressing this visibility matrix Mnp of the database BD in the server SERV, for example by means of the computer CAL.

An embodiment of the visibility data compression method enabling the size of the visibility matrix to be reduced is described below.

According to a feature of the invention, during a step E7, the rows i of the visibility matrix Mnp are put into a sequence that increases the consistency between the adjacent rows, or achieves the highest possible consistency, in order thereafter, during a step E8, to apply digital image coding to the visibility matrix so modified, the 1s and the 0s of the visibility matrix then forming the pixels of the digital image for coding. The computer CAL of the server SERV includes a corresponding coder for this purpose. There are therefore formed in the visibility matrix, by moving its rows, solid areas of 1s and solid areas of 0s, in the manner of a black and white digital image wherein black is represented by 0 and white by 1.

To execute the step E7, it is determined if rows i of the visibility matrix have a high number of common elements (number of common 0s and 1s). Similar rows are detected by applying the exclusive-OR (XOR) operator to some or all possible combinations of two rows of the matrix, for example. Two rows i1 and i2 have a large number of common elements if (i1)XOR(i2) has a large number of 0s. Under such circumstances, if the two rows i1 and i2 detected as having a large number of common elements have one or more rows between them having a smaller number of elements in common with the row i1, the rows of the matrix are permutated so that the rows i1 and i2 are in sequence. For example, for each successive row, common elements with each subsequent row of the matrix are detected. This groups together rows having the most common points.

The visibility matrix modified in this way is then coded in accordance with a digital image code. The coding effected may be any other kind of coding allowing the content of the item to be coded, and may be adaptive.

With regard to digital image coding, digital images usually have some continuity between adjacent rows because the same single-color area of the image is usually represented by pixels in adjacent rows having substantially the same value. This digital image coding is applied to the visibility matrix which in itself codes not an image but rather data formed by lists LOPV(i) of objects that are potentially visible. The Boolean elements of the matrix then form pixels that can have only the level 1 or the level 0 and to which digital image processing is applied.

This digital image coding has nothing to do with the image to be displayed on the screen ECR of the user's station CL, which image may optionally be a digital image, but, given that it is not applied to a digital image, produces a visibility data code I or a digital pseudo-image code I.

This digital image coding is of the JBIG (Joint Bi-level Image expert Group) type, for example, designed for lossless black and white images. JBIG coding in fact takes account of the content of the image to be coded and employs an adaptive arithmetic coder to predict and code current data as a function of previously coded data. The JBIG coder models redundancy in the image to be coded, considering the correlation of the pixels being coded with a set of pixels called the template. The template could comprise the preceding two pixels in the row and the five pixels centered above the current pixel in the row above, for example. JBIG coding can use even more precise adaptive templates and an arithmetic coder coupled to a probabilistic estimator, both offering very high performance.

Alternatively, the coding effected could be of the PNG (Portable Network Graphics) type, which is intended for graphic formats and is specifically designed for the Internet.

Figure 6:
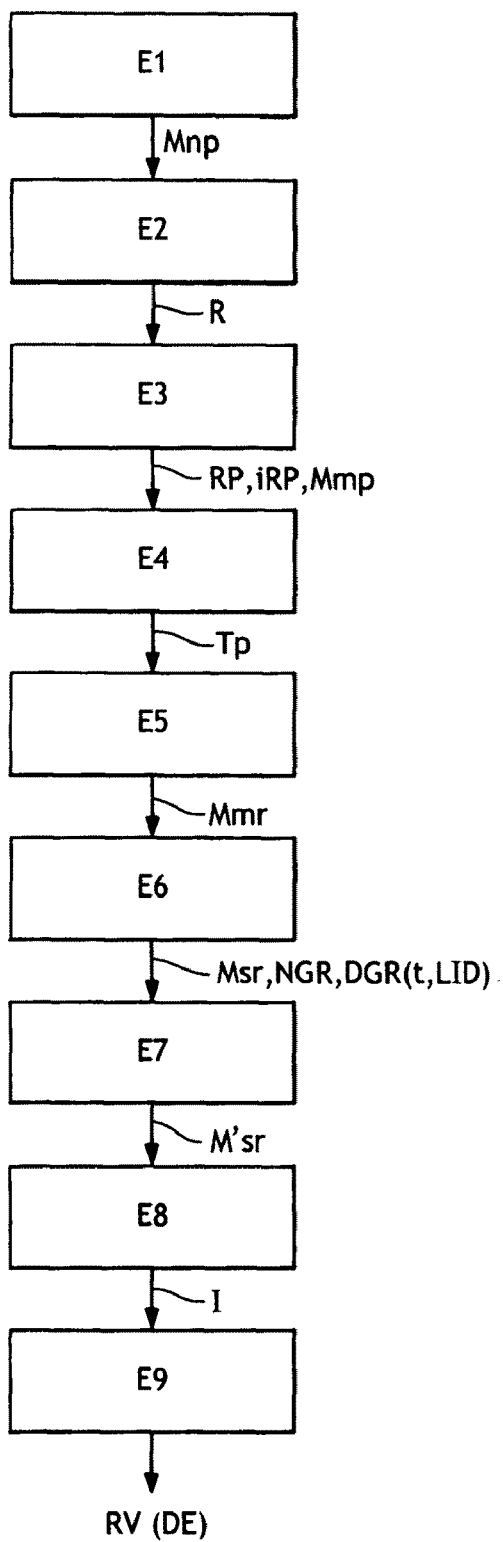
FIG. 6 represents a flowchart of one embodiment of the visibility data compression method according to the invention.

The step E7 of putting the rows in sequence may be effected directly on the visibility matrix Mnp or on a matrix Msr different from the visibility matrix Mnp and obtained from it, as in the embodiment of the method described below with reference to FIG. 6.

In this embodiment of the method, executed automatically in the server SERV, after a first starting step E1, during which the visibility matrix Mnp is formed, a second step E2 is executed during which the scene SC is divided into regions R. These regions R therefore cover the observation space EO and the objects OBJ, as represented in FIG. 7 for the same scene SC as in FIG. 3. The regions R are larger overall than the cells, so that practically every region R covers a plurality of cells at least partly. The regions R are all the same shape, for example, independently of the scene SC, and in particular are rectangular blocks in FIG. 7. These rectangular blocks R have their sides parallel to the blocks bounding the scene, for example, as shown in FIG. 7, and are erected vertically to form parallelepipedal blocks. In FIG. 7, the bold lines LIMR represent the limits of these rectangular blocks R and are therefore formed by straight line segments forming their sides. The coordinates of the regions R are stored in the database BD.

The region R to which the observation point P corresponding to the position information INFP contained in the request REQV belongs is then determined during a step E3. This region is referred to as the observation region RP below. For example, if xP and yP represent the abscissa and the ordinate of the point P in Cartesian coordinates in a horizontal plane with two axes x and y parallel to the sides of the rectangular blocks R in the FIG. 7 example, the coordinates (xminRP, xmaxRP, yminRP, ymaxRP) of the block RP are determined by comparison with (xP, yP) according to the following conditions:

xminRP≦xP≦xmaxRP; and yminRP≦yP≦ymaxRP.

There are then determined during the step E3, from the coordinates of the cells i and from the coordinates of the observation region RP, the cells, denoted iRP, having a non-zero intersection with the region RP of the point P, the number of those cells being m, for example, where m is less than or equal to n. There is then formed from the first visibility matrix Mnp a second visibility matrix Mmp having m rows formed by the cells of Mnp corresponding to the m cells iRP of the region RP and the p columns of Mnp. Consequently, the matrix Mmp is much smaller than the matrix Mnp.

Then, during a fourth step E4, a list Tp of the objects OBJ visible from the observation region RP is determined from the second matrix Mmp. Thus an object j visible from one of the cells iRP (corresponding to a 1 in the row for that object) is in this list Tp. The list Tp is obtained by applying the OR logic operator to the rows of the matrix Mmp, for example. This list Tp is for example formed of a p-bit table of the objects in the region RP, in which each bit j is equal to 1 if one or more 1s are present in the column j of the matrix Mmp (object j visible from one or more of the cells iRP) and each bit j is equal to 0 if the column j of the matrix Mmp contains only 0s (object j not visible from the cells iRP).

The columns j formed only of 0s, which correspond to objects not visible from the region RP of the observation point P, are eliminated from the second matrix Mmp determined in the step E3 during the next step E5 of reducing the size of the matrix, to obtain a third visibility matrix Mmr, where r≦p. Also, the positions of the columns eliminated are marked. For example, the columns j formed of 0s are detected as being set to a value 0 in the $j^{th}$ position of the list Tp of the objects OBJ visible from the region RP using the mechanism indicated below for the example of a matrix Mmp with m=6 rows and p=10 columns, having the row identifiers 1, 2, 3, 4, 5, 6 from top to bottom:

| 0 | 0 | 1 | 0 | 0 | 1 | 0 | 0 | 0 | 0 |
|---|---|---|---|---|---|---|---|---|---|
| 0 | 0 | 1 | 0 | 1 | 0 | 0 | 0 | 0 | 1 |
| 0 | 0 | 0 | 0 | 0 | 1 | 0 | 0 | 0 | 0 |
| 0 | 0 | 1 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 1 | 0 | 0 | 0 | 0 | for which the list Tp is therefore equal to:

| 0 | 0 | 1 | 0 | 1 | 1 | 0 | 0 | 0 | 1 |
|---|---|---|---|---|---|---|---|---|---| and, with m=6 and r=4, the third visibility matrix MMr is equal to:

| 1 | 0 | 1 | 0 |
|---|---|---|---|
| 1 | 1 | 0 | 1 |
| 0 | 0 | 1 | 0 |
| 1 | 1 | 0 | 0 |
| 1 | 0 | 1 | 0 |
| 0 | 0 | 1 | 0 |

The columns eliminated are marked by the position of the 0s in the list Tp of the objects OBJ visible from the region RP, i.e. for j=1, 2, 4, 7, 8, 9.

During the next step E6 of reducing the size of the matrix, whether the third visibility matrix Mmr has identical rows iRP is determined. If at least two rows i3 and i4 are identical, only one of them (i3) is retained in a fourth visibility matrix Msr obtained from the third visibility matrix Mmr, with s≦m. The groups GR=(i3, i4) of identical rows are determined, for example, by applying the exclusive-OR (XOR) operator to all possible combinations of two rows of Mmr. The two rows i3 and i4 are identical if (i3)XOR(i4) is a row of 0s.

The number NGR of groups GR of identical rows of the third visibility matrix Mmr is also calculated.

There is also calculated for each group GR of identical rows iRP a group data item DGR consisting of the number t of identical rows i3=i4 of the group GR, followed by the list LID of the identifiers i3, i4 (identifiers iRP) of the identical rows of the group GR.

Figure 8:
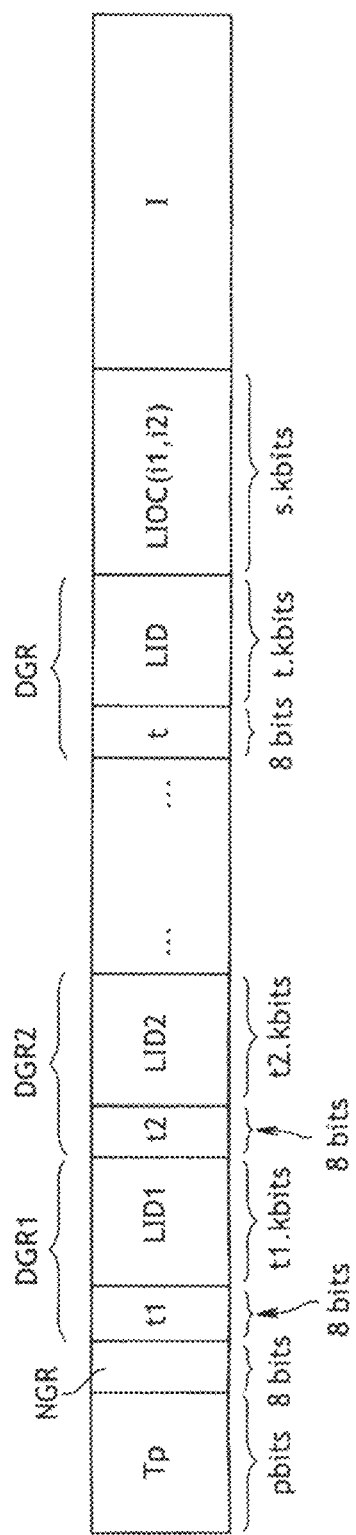
FIG. 8 represents the structure of visibility data compressed by the compression method according to FIG. 6.

As shown in FIG. 8, the number NGR of groups of identical rows iRP is coded on 8 bits, for example, each number t of identical rows of each group data item DGR is coded on 8 bits, and each list LID of the identifiers i3, i4 of the identical rows of the group GR is coded on t*k bits, where k is a fixed number of bits for coding and a row or cell identifier i3 or i4. The data items DGR are coded one after the other. The change from a first data item DGR1 of a first group GR1 to a second data item DGR2 of a second group GR2, after the first data item DGR1, is decoded by virtue of the fact that there are expected after the number t1 of identical rows of DGR1, 8 bits long, only t1*k bits for the list LID1 of the identifiers of the identical rows of the group GR1, and that after these t1*k bits there begin the t2 identical rows of DGR2, 8 bits long, followed by the t2*k bits of the list LID2 of the identifiers of identical rows of DGR2, t2 being the number of identical rows of DGR2.

Thus in the foregoing example:
NGR=2;
DGR=(2, 1, 5, 2, 3, 6) for
DGR1=(2, 1, 5) with t1=2, LID1=1, 5 (first and fifth rows of Mmr identical) and
DGR2=(2, 3, 6) with t2=2, LID2=3, 6 (third and sixth rows of Mmr identical); and
Msr equal (with s=4 and r=4 and after eliminating rows 1 and 6 of Mmr and retaining the rows of identifiers 2, 3, 4, 5 from top to bottom).

| 1 | 1 | 0 | 1 |
|---|---|---|---|
| 0 | 0 | 1 | 0 |
| 1 | 1 | 0 | 0 |
| 1 | 0 | 1 | 0 |

There are then executed the step E7 of putting the rows described above into sequence in the fourth visibility matrix Msr to obtain the fifth visibility matrix M'sr and the digital image coding step E8 described above applied to the fifth visibility matrix M'sr, to obtain the digital pseudo-image code i. This fifth visibility matrix M'sr is referred to as the visibility matrix M'sr modified relative to the original first visibility matrix Mnp.

The s identifiers iRP of the rows i1, i2 in sequence in the fifth visibility matrix M'sr are stored, in their order of occurrence (for example from top to bottom) in this fifth matrix M'sr, in a list LIOC called the list of the identifiers i1, i2 of the cells put into sequence for the digital image coding of the fifth matrix M'sr or the list LIOC of the identifiers i1, i2 of the cells of the modified visibility matrix M'sr. This list LIOC of the identifiers of the cells put into sequence is different from the lists LID of identical cells of the groups GR. The list LIOC of the identifiers of the cells put into sequence is coded on s*k bits, where k is a fixed number of bits for coding a row or cell identifier i1 or i2.

Applied to the matrix Msr of the above example, the step E7 yields the following visibility matrix M'sr, for example:

| 0 | 0 | 1 | 0 |
| 1 | 0 | 1 | 0 |
| 1 | 1 | 0 | 0 |
| 1 | 1 | 0 | 1 | i.e. from top to bottom the order of the identifiers 3, 5, 4, 2 of the rows 2, 3, 4, 5 of Mmp, Mmr and Msr. Thus LIOC=(3, 5, 4, 2).

This matrix M'sr includes the following solid area of 1s:

| | 1 | |
| | 1 | 1 |
| | 1 | 1 |

The steps E3, E4, E5, E6, E7, E8, E9 are executed for each observation point P indicated in the request REQV and for each region RP that has been determined to which the observation point P belongs. The order of the steps E5 and E6 may be reversed, if appropriate.

The data DE of the response RV comprises, see FIG. 1, visibility data DVE as such as geometrical data DGE from the base BD, equal to the data DVOBJ relating to the objects OBJ visible from the observation region RP. This data DGE is selected by the computer CAL of the server SERV in the data DVOBJ from the database BD during the step E4 or E5, for example, using the list Tp of the objects OBJ visible from the region RP.

The visibility data DVE is determined by the computer CAL of the server SERV after the coding step E8 and comprises, in FIG. 8:

- the list Tp of the objects OBJ visible from the region RP of the observation point P;
- the number NGR of groups GR of identical rows;
- the data DGR(1, LID) of groups of identical rows;
- the list LIOC of the identifiers i1, i2 of the cells put into sequence for digital image coding of the fifth matrix M'sr;
- the digital pseudo-image code I, equal to the fifth matrix M'sr coded by the digital image coding by the step E8.

The table below gives the results of tests on the above-described compression method. These tests were carried out on a database BD defining a virtual city of 5750 objects and 29153 viewing cells.

| | |
|---|---|
| Size of the visibility matrix Mnp of the entire uncompressed base | 20.95 Mbytes |
| Size of the objects of the base (geometrical data DVOBJ) | 23.7 Mbytes |
| Average size of the visibility matrices Mmp of the observation regions RP before compression | 28 kbytes |
| Test 0: Average size of the visibility matrices Mmr for which the columns 0 have been eliminated | 2260 bytes |
| Test 1: Size of the code obtained by the lossless coding by ranges in accordance with the above-mentioned paper by Van de Panne and Stewart, applied to the matrices of the test 0 | 1867 bytes |
| Test 2: Size of the visibility data DVE obtained by the data compression method of the invention and having the structure of FIG. 8 with JBIG coding | 627 bytes |

It is therefore clear that the method of the invention enables more lossless compression of the visibility data according to test 2 than the lossless coding effected according to test 1 starting from prior art lossless coding.

Figure 9:
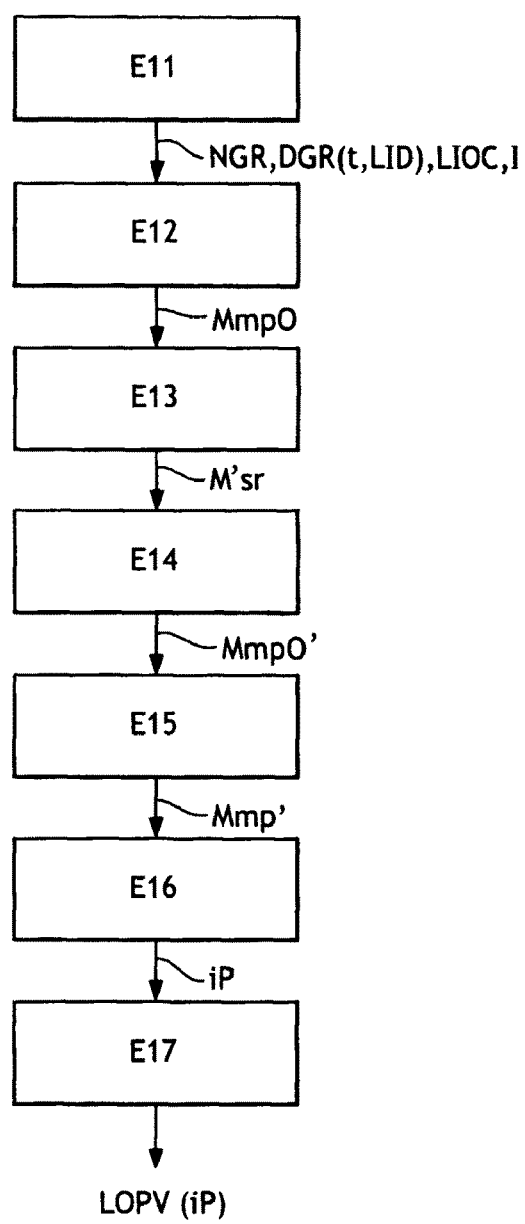
FIG. 9 represents a flowchart of one embodiment of the visibility data decompression method of the invention.

After receiving the response RV containing the visibility data DVE, the station CL of the user decompresses the visibility data DVE in the manner shown in FIG. 9. To this end the station CL includes means for automatically decompressing the data DVE, for example a computer CAL2.

There is described below an embodiment of the method of compressing visibility data DVE enabling the second visibility matrix Mmp of the observation region RP to be obtained for each response RV received associated with a preceding request REQV(INFP). This embodiment is implemented in a decoder of the computer CAL2, for example.

The station CL storing the fact that the list Tp of the objects OBJ visible from the region RP of the observation point P is coded on p bits, that the number NGR of groups GR of identical rows is coded on 8 bits, that the data items DGR(t, LID) of groups of identical rows are each coded on 8 bits+t.k bits, and that the list LIOC of the identifiers of the cells i1, i2 put into sequence is coded on s*k bits, the station CL extracts from the received response RV the list Tp, the number NGR, the data items DGR(t, LID), the list LIOC and the digital pseudo-image code I and stores them in its local database BL during a first extraction step E11. The data DGE of the objects from the response RV is also stored in the local database BL.

During a second step E12 of the decompression process, a sixth Boolean matrix Mmp0 having m rows and p columns is constructed, m and p being determined from the data DVE of the response RV, namely from the list Tp for p and from the lists LID of the identifiers i3, i4 of identical rows of the groups GR and from the list LIOC of the identifiers of the cells i1, i2 put into sequence for m.

The positions of the columns to be set to 0 in the matrix Mmp0, which are located at the positions of the 0s of the list Tp of visible objects, are then deduced from the list Tp.

There following matrix Mmp0 is therefore obtained in the foregoing example, for m=6 and p=10:

| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

The code I is then decoded in the station CL during the step E13 by digital image decoding that is the converse of the digital image coding performed in the server SERV in the step E8, the characteristics of this decoding being present in a memory of the station CL. This decoding therefore produces the fifth visibility matrix M'sr from the step E7.

During the next step E14, the columns of the fifth visibility matrix M'sr are transferred into the empty columns of the sixth matrix Mmp0, located at the positions of the 1s of the list Tp of visible objects, i.e. in the foregoing example at the positions not filled with columns of 0s, to obtain a seventh matrix Mmp0'. This filling is effected in the same sequence for the columns of the fifth matrix M'sr and for the empty columns of the sixth matrix Mmp0. Given that the fifth matrix M'sr has a lower number s of rows than the sixth matrix Mmp0, only the first s rows in the sixth matrix Mmp0 coming from M'sr are filled.

The list LIOC of the identifiers i1, i2 of the cells put into sequence indicates the identifiers of the first s rows of the seventh matrix Mmp0' that have been filled in this way. There is therefore no need to effect the permutations that are the converse of those effected in the step E7, as the identifiers of the filled rows of Mmp0 are known from the list LIOC.

Thus in the foregoing example the step E14 produces the following seventh matrix Mmp0' in the station CL, in which the $3^{rd}$, $5^{th}$, $6^{th}$ and $10^{th}$ columns are filled by M'sr on the first s=4 rows, corresponding, according to the list LIOC, to the cells 3, 5, 4, 2 of Mnp.

| 0 | 0 | 0 | 0 | 0 | 1 | 0 | 0 | 0 | 0 |
|---|---|---|---|---|---|---|---|---|---|
| 0 | 0 | 1 | 0 | 0 | 1 | 0 | 0 | 0 | 0 |
| 0 | 0 | 1 | 0 | 1 | 0 | 0 | 0 | 0 | 0 |
| 0 | 0 | 1 | 0 | 1 | 0 | 0 | 0 | 0 | 1 |
| 0 | 0 |   |   | 0 |   |   | 0 | 0 | 0 |
| 0 | 0 |   |   | 0 |   |   | 0 | 0 | 0 |

In the next step E15, the duplicated rows defined by the number NGR of groups of identical rows and the data items DGR(t, LID) of groups are added to the seventh matrix Mmp0' obtained in the step E14 to obtain an eighth matrix Mmp'. The rows added replace the rows of the seventh matrix Mmp0' that have not been filled in. The data DGR is decoded in the step E6, in the manner indicated below, using the number NGR of groups of identical rows and the number t of identical rows and the list LID of the identifiers of the identical rows, which are contained in the data DGR.

In the foregoing example, there are therefore added to the matrix Mmp0' to form the matrix Mmp' a row with identifier 1 equal to the row with identifier 5 of Mmp0', according to DGR1, and a row with identifier 6, equal to the row with identifier 3 of Mmp0', according to DGR2, i.e. the last two rows of the matrix Mmp' below, having from the bottom up the cells with identifiers 3, 5, 4, 2, 1, 6, which therefore corresponds to the matrix Mmp:

| 0 | 0 | 0 | 0 | 0 | 1 | 0 | 0 | 0 | 0 |
|---|---|---|---|---|---|---|---|---|---|
| 0 | 0 | 1 | 0 | 0 | 1 | 0 | 0 | 0 | 0 |
| 0 | 0 | 1 | 0 | 1 | 0 | 0 | 0 | 0 | 0 |
| 0 | 0 | 1 | 0 | 1 | 0 | 0 | 0 | 0 | 1 |
| 0 | 0 | 1 | 0 | 0 | 1 | 0 | 0 | 0 | 0 |
| 0 | 0 | 1 | 0 | 0 | 1 | 0 | 0 | 0 | 0 |

The station CL stores the eighth matrix Mmp' obtained by the step E15 in its local database.

In the next step E16, the station CL determines the cell iRP of the eighth matrix Mmp' to which the observation point P belongs from the coordinates and identifiers of the cells i present in the local database BL and from the position information INFP of the observation point P, which was determined by the computer CAL2 for sending the preceding request REQV and was also stored in the local database BL with the request REQV sent. The cell i of the point P found in this way then has the identifier iP in the local database BL, for example.

The computer CAL2 then determines the position of the row corresponding to the cell iP in the eighth matrix Mmp' of the database BL from this identifier iP and from the list LIOC of the identifiers of the cells i1, i2 put into sequence, which is stored in the local database BL.

The computer CAL2 obtains the list LOPV(iP) of objects visible from the observation point P by scanning the row iP of the eighth matrix Mmp' of the base BL.

The station CL then, in the step E17, uses the list LOPV(iP) of objects visible from the observation point P and the data DVOBJ of the corresponding objects to display on the screen ECR a corresponding image that represents objects OBJ seen from the observation point P, which are those defined by the data DVOBJ for which a 1 appears in this list LOPV(iP) and does not represent objects OBJ not seen from the observation point P, which are those defined by the data DVOBJ for which a 0 appears in this list LOPV(iP).

The user of the station CL can then move the observation point P to a new point P2. On each displacement of the observation point P to a new position INFP2 in the space EO, whether the new observation point P2 is in a cell already present in a matrix Mmp' stored in the local base BL is automatically determined in the station CL. If so, the corresponding matrix Mmp' is looked for in the base BL of the station CL in order to execute the step E16 again for this cell iRP of this matrix Mmp' and the step E17. If not, the station CL sends a new request REQV2 containing the position information INFP2 of the new observation point P2 to the server SERV, which sends back a new response RV2 in the manner described above. For each new response RV2, the server SERV determines whether data DGE to be inserted into that new response RV2 has already been transmitted in a preceding response RV, and if so, in the new response RV2 it does not transmit this data DGE that has already been transmitted. Instead, in the new response RV2 it transmits only the data DGE that has not yet been transmitted, which further reduces the quantity of data transmitted in the new response RV2.

Similarly, on each displacement of the observation point P to a new position INFP2 in the space EO, it is automatically determined in the station CL whether the new observation point P2 is in a cell iRP already present in the eighth matrix Mmp' obtained by the preceding response RV, which has enabled the preceding image for the point P to be displayed. If so, there is no need to send a new request REQV2 for the new point P2. The list LOPV(iP2) for the new observation point P2 can then be deduced from the list LOPV(iP) for the preceding observation point P, by adding a list LOPV(iP2)$^+$ of the supplementary objects compared to the list LOPV(iP) for the preceding observation point P and removing a list LOPV(iP2)$^-$ of missing objects compared to the list LOPV(iP) for the preceding observation point P. The two lists LOPV(iP2)$^+$ and LOPV(iP2)$^-$ are calculated in the station CL from the lists LOPV(iP) and LOPV(iP2) of the preceding matrix Mmp' obtained for the point P, for example by applying the exclusive-OR operator to them, to obtain a list of the objects that differ between these lists (indicated by the 1 in (LOPV(iP))

XOR(LOPV(iP2)). This avoids having to scan the whole of the list LOPV(iP2), which may be very long.

Alternatively, the visibility data is compressed in advance, for example, in the form of the matrix M'sr for each of the regions R, before the system SERV receives the observation point position information INFP.

Computer programs are installed on the system SERV and on the unit CL, for example, to execute the compression process on the system SERV and the decompression process on the unit CL.

The invention claimed is:

1. A method of compressing visibility data from a visibility database; the visibility data including cells of observation points in an observation space for observing predetermined objects and, for each cell of observation points, a list of the objects from among said predetermined objects that are potentially visible from that cell of observation points; and the visibility data being represented in the visibility database as at least a first visibility matrix of Boolean elements in which each row corresponds to a cell and each column corresponds to one of said predetermined objects, the Boolean elements respectively situated in an $i^{th}$ row and a $j^{th}$ column having one of a logic value 1 if the object belongs to the list of potentially visible objects associated with the cell and a logic value of 0 if the object does not belong to the list of potentially visible objects associated with the cell the method comprising:

automatically detecting in the visibility database non-adjacent rows in a visibility matrix having a high number of common elements, and permutating rows to place rows detected as having a high number of common elements into a sequence to form a modified visibility matrix having a same number of rows as the visibility matrix; and automatically applying digital image coding to the Boolean elements of the modified visibility matrix to obtain a visibility data code, the Boolean elements of the modified visibility matrix forming pixels of the digital image for coding.

2. The compression method according to claim 1, wherein the visibility database is associated with a data processing system which transmits the obtained visibility data code to a visibility data processing unit.

3. The compression method according to claim 2, wherein the data processing system is a data server and the visibility data processing unit is a visibility data processing station.

4. The compression method according to claim 2, wherein the data processing system and the visibility data processing unit are provided in a same visibility data processing station.

5. The compression method according to claim 2, wherein the data processing system receives information about a position of a particular observation point in an observation space from the processing unit beforehand and the observation space is divided into regions in the visibility database, the method further comprising automatically executing in the data processing system the steps of:

determining an observation region from among regions of the observation space to which the observation point corresponding to the position information received from the processing unit belongs;

determining first cells from among cells of the visibility data having an intersection with an observation region;

extracting, from the first visibility matrix, a second visibility matrix in which the rows of the first visibility matrix, which correspond to said first cells of the observation region that have been determined, are formed; and forming the modified visibility matrix from the second visibility matrix.

6. The compression method according to claim 5, wherein a list of the potentially visible objects from the observation region is automatically determined in the data processing system from the second visibility matrix and sent to the processing unit by the data processing system with the visibility data code.

7. The compression method according to claim 5, wherein a list of identifiers of the cells of the modified visibility matrix is sent to the processing unit by the data processing system with the visibility data code.

8. The compression method according to claim 2, wherein identical rows of the visibility matrix are automatically determined in the data processing system to retain in a fourth visibility matrix only one row per group of identical rows, the modified visibility matrix being formed from the fourth visibility matrix, and wherein the method further comprising calculating automatically in the data processing system:

a data item comprising a number of groups of identical rows of the visibility matrix; and for each group of identical rows:

a group data item comprising a number of identical rows of the group and a list of the identifiers of the identical rows of said group;

said data item that is the number of groups of identical rows and said group data item being sent to the processing unit by the data processing system with the visibility data code.

9. The compression method according to claim 8, wherein, for each group of identical rows, the number of identical rows of said group is coded on a predetermined number of bits and each identifier of the identical rows from said list of said group is coded on a predetermined number of bits, each group data item consisting, in a prescribed sequence for all the groups, of said number of identical rows of the group and said list of the identifiers of the identical rows of the group.

10. The compression method according to claim 1, wherein at least one column of 0s which exists in the visibility matrix is detected automatically and any such detected column of 0s is automatically eliminated from the visibility matrix to form a third visibility matrix from which the modified visibility matrix is formed.

11. The compression method according to claim 1, wherein said digital image coding applied to the Boolean elements of the modified visibility matrix is one of Joint Bi-Level Image expert Group (JBIG) and Portable Network Graphics (PNG).

12. A method of decompressing visibility code data generated by the visibility data compression method according to claim 1, wherein digital image decoding is applied to the obtained visibility data code the digital image decoding being a converse of the digital image coding applied by said compression method, and the digital image decoding producing the modified visibility matrix.

13. A method of decompressing visibility code data generated by the visibility data compression method according to claim 6, wherein digital image decoding is applied to the obtained visibility data code, the image decoding being a converse of the digital image coding applied by said compression method, the decoding producing a visibility matrix, and wherein columns of 0s are added automatically to the visibility matrix obtained by said digital image decoding at locations of the objects that are not potentially visible indicated by the list of objects potentially visible from the observation region.

14. A method of decompressing visibility code data generated by the visibility data compression method according to claim 8, wherein digital image decoding is applied to the generated visibility data code, the digital image decoding being a converse of the digital image coding applied by said compression method, the decoding producing a visibility matrix, and wherein at least one missing row indicated by the identifiers of the identical rows present in the list of identifiers of the identical rows of the group data item and absent from said visibility matrix is automatically added to the visibility matrix obtained by said digital image decoding, at least one missing row then being equal to the row of the visibility matrix having the identifier present in said list of identifiers of the identical rows.

15. A decoder, including means for executing the visibility data decompression method according to claim 12.

16. A visibility data compression system associated with a visibility database; the visibility data including cells of observation points in an observation space for observing predetermined objects and, for each cell of observation points, a list of objects from among said predetermined objects that are potentially visible from that cell of observation points; and the visibility data being represented in the visibility database as at least a first visibility matrix of Boolean elements, in which each row corresponds to a cell and each column corresponds to one of said predetermined objects, the Boolean elements respectively situated in an $i^{th}$ row and a $j^{th}$ column having one of a logic value of 1 if the object belongs to the list of potentially visible objects associated with the cell and a logic value of 0 if the object does not belong to the list of potentially visible objects associated with the cell; the system comprising:

means for automatically detecting in the visibility database non-adjacent rows in the visibility matrix having a large number of common elements, and row permutation means for placing into a sequence the rows detected as having a large number of common elements to form a modified visibility matrix having a same number of rows as the visibility matrix; and means for automatically applying digital image coding to the Boolean elements of the modified visibility matrix to obtain a visibility data code, the Boolean elements of the modified visibility matrix forming pixels of the digital image for coding.

17. A visibility data processing station configured to apply digital image decoding to a digital image having pixels comprising Boolean elements of a modified visibility matrix having a same number of rows as a visibility matrix, said modified visibility matrix being obtained from visibility data;

wherein said visibility data initially includes cells of observation points in an observation space for observing predetermined objects and, for each cell of observation points, a list of the objects from among said predetermined objects that are potentially visible from that cell of observation points;

wherein said visibility data is initially represented as at least a first visibility matrix of Boolean elements in which each row corresponds to a cell and each column corresponds to one of said predetermined objects, the Boolean elements respectively situated in an $i^{th}$ row and a $j^{th}$ column having a logic value of 1 if the object belongs to the list of potentially visible objects associated with the cell and a logic value of 0 if the object does not belong to the list of potentially visible objects associated with the cell; and wherein the visibility data is submitted to means for automatically detecting non-adjacent rows in the visibility matrix having a large number of common elements and to row permutation means for placing rows detected as having a large number of common elements into a sequence to form said modified visibility matrix having the same number of rows as the visibility matrix.

18. A computer program stored in a non-transitory computer readable medium and executing on a processor, which when used in a computer system, causes data compression of visibility data from a visibility database, the visibility data including cells of observation points in an observation space for observing predetermined objects and, for each cell of observation points, a list of the objects from among said predetermined objects that are potentially visible from that cell of observation points; and the visibility data being represented in the visibility database as at least a first visibility matrix of Boolean elements in which each row corresponds to a cell and each column corresponds to one of said predetermined objects, the Boolean elements respectively situated in an $i^{th}$ row and a $j^{th}$ column having one of a logic value 1 if the object belongs to the list of potentially visible objects associated with the cell and a logic value of 0 if the object does not belong to the list of potentially visible objects associated with the cell, the computer program comprising:

program code for automatically detecting in the visibility database non-adjacent rows in a visibility matrix having a high number of common elements, permutating rows to place rows detected as having a high number of common elements into a sequence to form a modified visibility matrix having a same number of rows as the visibility matrix; and program code for automatically applying digital image coding to the Boolean elements of the modified visibility matrix to obtain a visibility data code, the Boolean elements of the modified visibility matrix forming pixels of the digital image for coding.

19. A computer program executing on a processor, which when used is a computer system, causes including instructions that implement data decompression of visibility code data of a visibility data base in accordance with claim 18, the computer program further comprising:

program code for applying digital image decoding to the obtained visibility data code, the digital image decoding being a converse of the digital image coding applied by said compression method, and the digital image decoding producing the modified visibility matrix.

* * * * *